United States Patent [19]

Tanaka

[11] Patent Number: 5,715,336
[45] Date of Patent: Feb. 3, 1998

[54] CHARACTER RECOGNITION METHOD AND APPARATUS THAT RE-INPUTS IMAGE DATA AT A SECOND RESOLUTION DERIVED FROM THE CHARACTER SIZE AND A SELECTED NORMALIZATION SIZE

[75] Inventor: Tetsuomi Tanaka, Yokohama, Japan

[73] Assignee: Canon Kabushiki Kaisha, Tokyo, Japan

[21] Appl. No.: 317,841

[22] Filed: Oct. 4, 1994

Related U.S. Application Data

[63] Continuation of Ser. No. 738,556, Jul. 31, 1991, abandoned.

[30] Foreign Application Priority Data

Aug. 3, 1990 [JP] Japan ............................ 2-205230
Jul. 18, 1991 [JP] Japan ............................ 3-178228

[51] Int. Cl.$^6$ ............................................. G06K 9/03
[52] U.S. Cl. ............................................. 382/301; 382/318
[58] Field of Search ............................ 382/10, 47, 62, 382/63, 177, 181, 298, 301, 318, 319

[56] References Cited

U.S. PATENT DOCUMENTS

| | | | |
|---|---|---|---|
| 3,223,973 | 12/1965 | Chatten | 382/47 |
| 3,273,124 | 9/1966 | Greanias | 340/146.3 |
| 3,921,136 | 11/1975 | Bar-Lev | 382/47 |
| 4,045,772 | 8/1977 | Bouton et al. | 340/146.3 B |
| 4,516,265 | 5/1985 | Kizu et al. | 382/48 |
| 4,769,851 | 9/1988 | Nishijima et al. | 382/47 |
| 5,197,107 | 3/1993 | Katsuyama et al. | 382/30 |

FOREIGN PATENT DOCUMENTS 0368671  5/1990  European Pat. Off. ......... G06K 9/48

OTHER PUBLICATIONS

"Bildvorbereitung Fur Die Automatische Zeichenerkennung", J. Schurmann Wissenschaftliche Berichte Aeg Telefunken, vol.47, No.3/4, 1974, pp.90–99.

"Optimizing The Digital Learning Network For . . . " S.N. Abbas, et al., 7th European Conference on Electronics, IEEE, Apr. 1986, Paris, FR pp. 505–513.

Primary Examiner—Andrew Johns
Attorney, Agent, or Firm—Fitzpatrick, Cella, Harper & Scinto

[57] ABSTRACT

There is disclosed a character recognition method, and an apparatus therefor, capable of improving the accuracy of character recognition employing character normalization and direction index counting. The original image information is read with a resolving power matching the character size, so that the result of direction index counting is not distorted by the character size change in the normalization.

12 Claims, 13 Drawing Sheets

DIRECTION INDEX  1 --- 0
2 --- 2
3 --- 0
4 --- 2

FIG. 3B

↑ NORMALIZATION

↑ SMOOTHING

GAUSS FILTER COEFFICIENT

| 0 | 0.01 | 0.02 | 0.01 | 0 |
|---|---|---|---|---|
| 0.01 | 0.06 | 0.11 | 0.06 | 0.01 |
| 0.02 | 0.11 | 0.19 | 0.11 | 0.02 |
| 0.01 | 0.06 | 0.11 | 0.06 | 0.01 |
| 0 | 0.01 | 0.02 | 0.01 | 0 |

FIG. 13B

VECTOR NORMALIZATION COEFFICIENT: a

| 0 | 0.01 a | 0.02 a | 0.01 a | 0 |
|---|---|---|---|---|
| 0.01 a | 0.06 a | 0.11 a | 0.06 a | 0.01 a |
| 0.02 a | 0.11 a | 0.19 a | 0.11 a | 0.02 a |
| 0.01 a | 0.06 a | 0.11 a | 0.06 a | 0.01 a |
| 0 | 0.01 a | 0.02 a | 0.01 a | 0 |

FIG. 13C

VECTOR NORMALIZATION COEFFICIENT: 1

| 0 | 0.01 | 0.02 | 0.01 | 0 |
|---|---|---|---|---|
| 0.01 | 0.06 | 0.11 | 0.06 | 0.01 |
| 0.02 | 0.11 | 0.19 | 0.11 | 0.02 |
| 0.01 | 0.06 | 0.11 | 0.06 | 0.01 |
| 0 | 0.01 | 0.02 | 0.01 | 0 |

FIG. 13D

VECTOR NORMALIZATION COEFFICIENT: b

| 0 | 0.01 b | 0.02 b | 0.01 b | 0 |
|---|---|---|---|---|
| 0.01 b | 0.06 b | 0.11 b | 0.06 b | 0.01 b |
| 0.02 b | 0.11 b | 0.19 b | 0.11 b | 0.02 b |
| 0.01 b | 0.06 b | 0.11 b | 0.06 b | 0.01 b |
| 0 | 0.01 b | 0.02 b | 0.01 b | 0 |

FIG. 16A  HOST BUILT-IN TYPE

FIG. 16B  SCANNER BUILT-IN TYPE

FIG. 16C  INDEPENDENT TYPE

CHARACTER RECOGNITION METHOD AND APPARATUS THAT RE-INPUTS IMAGE DATA AT A SECOND RESOLUTION DERIVED FROM THE CHARACTER SIZE AND A SELECTED NORMALIZATION SIZE

This application is a continuation of application Ser. No. 07/738,556, filed Jul. 31, 1991, now abandoned.

BACKGROUND OF THE INVENTION

1. Field of the Invention

The present invention relates to an image processing method and an apparatus therefor, and more particularly to an image processing method featured in size normalization in response to the input image information, and an apparatus therefor.

2. Related Background Art

Figure 14:
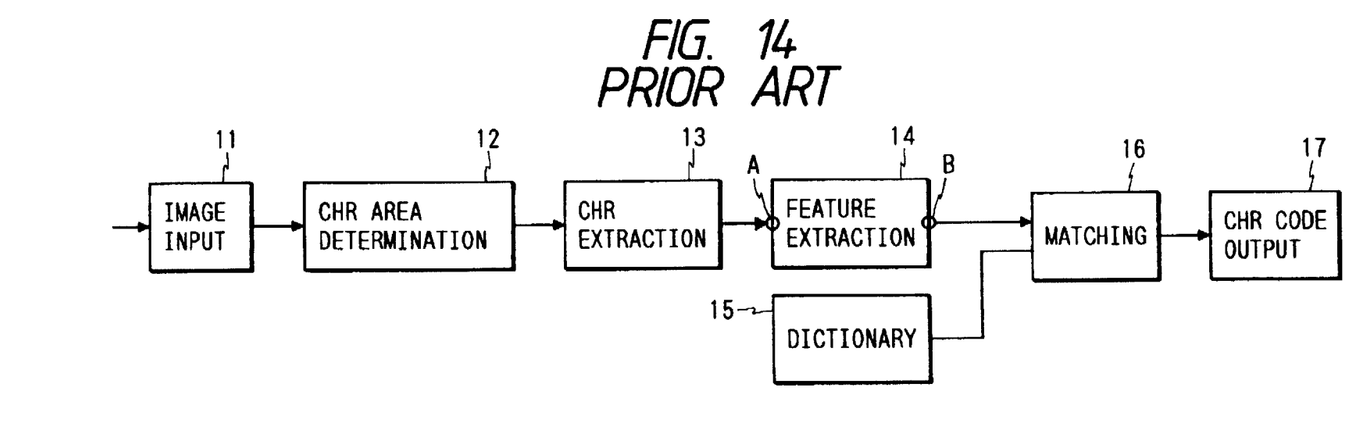
FIG. 14 is a block diagram of a conventional image processing apparatus.

At first, reference is made to FIG. 14 which is a schematic block diagram of a character recognition apparatus, wherein provided are an image input unit 11 for receiving an image from an image reader such as a CCD; a character area determination unit 12 for separating a character area from the entered image; a character extraction unit 13 for extracting a character in the character area in a recognizable size; a feature extraction unit 14 for extracting the feature of the extracted character pattern, utilizing a character pattern normalized to a predetermined size; a dictionary unit 15 for storing characters and features in mutually related manner, in correspondence with the feature extraction by said feature extraction unit 14; a matching unit 16 for comparing the feature obtained from the feature extraction unit 14 with that obtained from the dictionary unit 15 and selecting a candidate character for example from the distance of said feature; and a character code output unit 17 for releasing a character code of the recognized character.

Figure 4A:
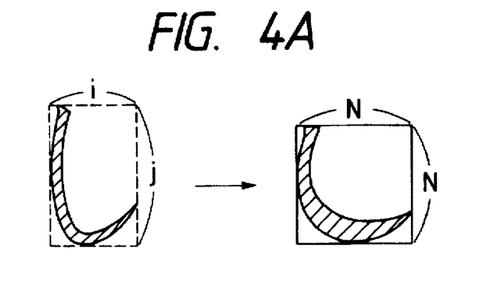
FIGS. 4A and 4B are views showing a normalization process.
Figure 4B:
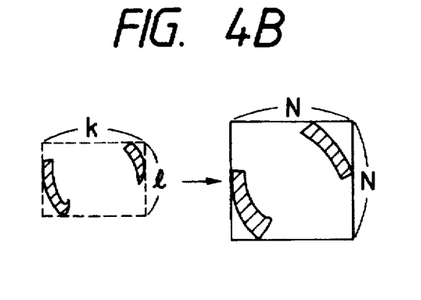
Figure 5:
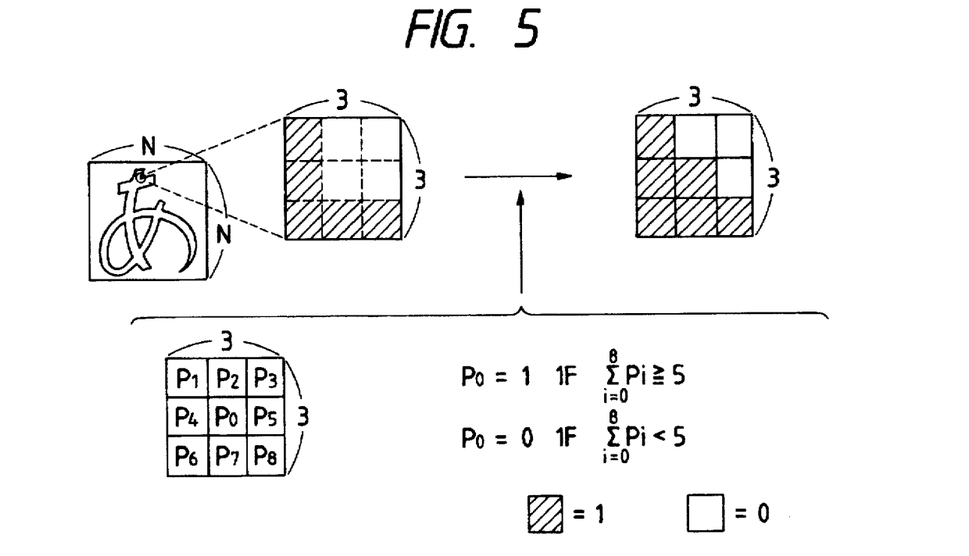
FIG. 5 is a view showing a smoothing process.
Figure 6:
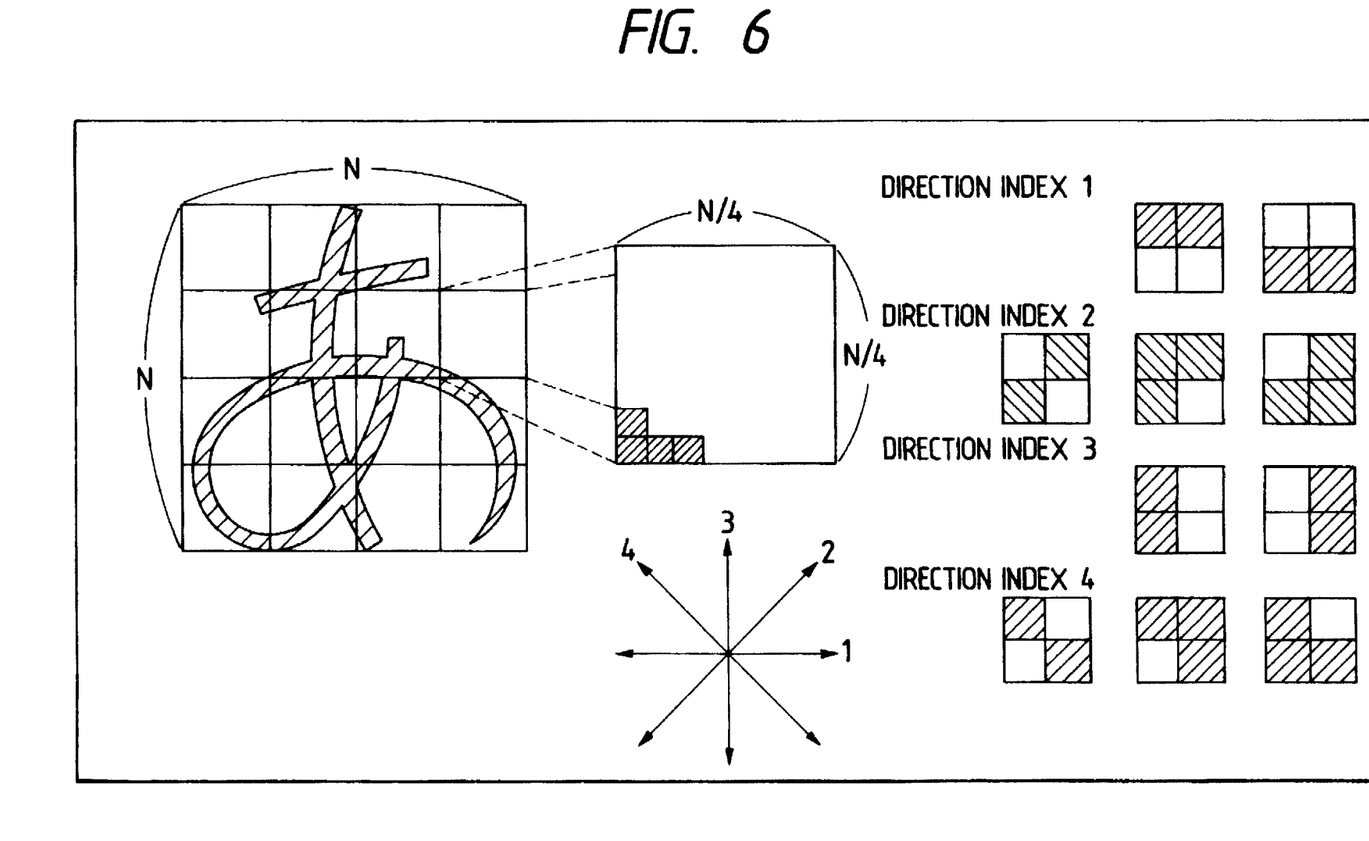
FIG. 6 is a view showing direction indexes.
Figure 15:
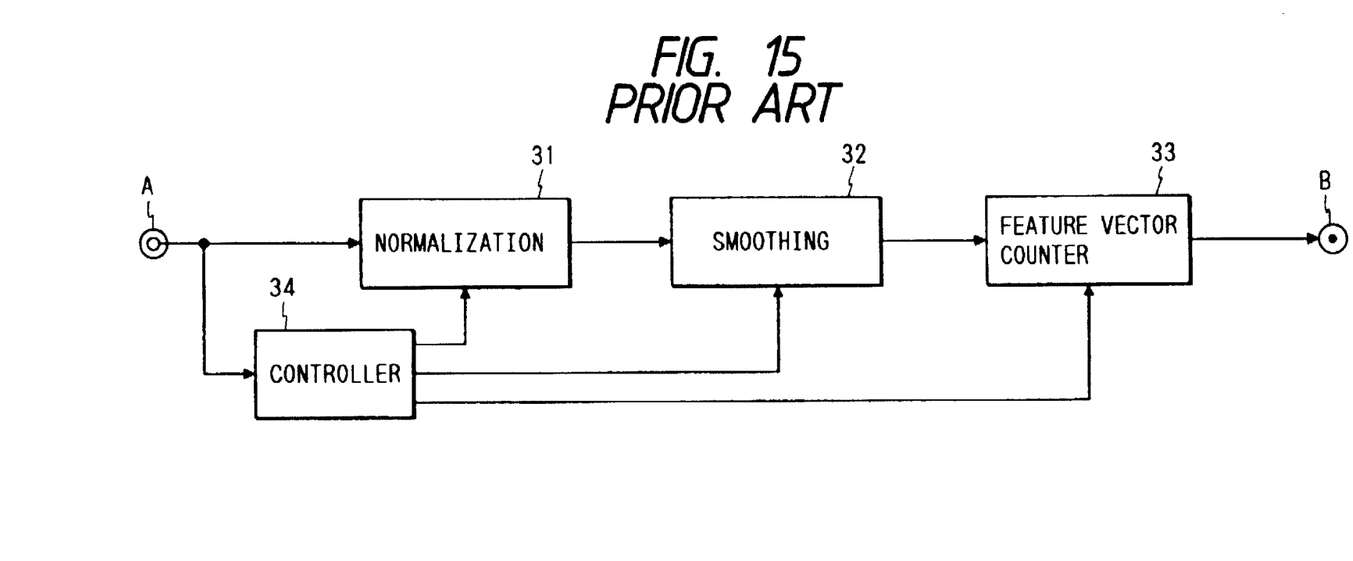
FIG. 15 is a block diagram of a conventional feature extraction unit.

The feature extraction unit 14 of such conventional character recognition apparatus is constructed as shown in FIG. 15. An input terminal A receives a character pattern and information on the size thereof from the character extraction unit 13. A normalization unit 31 normalizes each character image into a size N×N as shown in FIGS. 4A and 4B. A smoothing unit 32 applies a 3×3 filter to each pixel as shown in FIG. 5, thereby reducing the distortion by normalization. A feature vector counter unit 33 divides the N×N normalized image into N×N blocks as shown in FIG. 6, and calculates a histogram of direction indexes 1–4 by applying a 2×2 mask to each block. An output terminal B sends the direction index, obtained in said counter unit 33, as a feature vector to the matching unit 16. A control unit 34 effects input/output control of various units.

In such conventional structure, however, since any character pattern is normalized regardless of the size thereof, by the normalization unit 31, into a constant size N×N, the feature vector is significantly distorted if the rate of size change is large. As a specific example, let us consider 3×3 pixels shown in FIG. 3A. This original image has 0 direction index "1", 2 direction index "2", 0 direction index "3" and 2 direction index "4". However, an image normalized to 12×12 as shown in FIG. 3B has 18 direction index "1", 2 direction index "2", 18 direction index "3" and 2 direction index "4" and no longer has the feature of the original image. A smoothing process provides a certain improvement, as shown in FIG. 3C, with 6 direction index "1", 8 direction index "2", 6 direction index "3" and 8 direction index "4", but the distortion becomes excessively large and can no longer be corrected by the smoothing as the ratio of size change becomes larger.

On the other hand, if the original image is as shown in FIG. 3B and the ratio of size change is unity, the smoothing operation does not improve the result but increases the distortion of the feature vector. More specifically, the same feature vectors are obtained from entirely different original images, one being a small rhomb in FIG. 3A and the other being a cross in FIG. 3B. Distortion appears also in case of image size reduction.

Thus an image enlargement reduces the diagonal components and increases the vertical and horizontal components as the ratio of image enlargement becomes larger. On the other hand, an image reduction reduces the vertical and horizontal components and increases the diagonal components, as the ratio of image reduction becomes larger. These tendencies cannot be fully corrected by any smoothing operation.

SUMMARY OF THE INVENTION

In consideration of the foregoing, the object of the present invention is to provide a character recognition method capable of preventing deterioration in the feature vectors resulting from normalization or smoothing, thereby providing a high recognition rate, and an apparatus therefor.

The above-mentioned object can be attained, according to the present invention, by an image processing method for recognizing characters in entered image information, featured by deriving a resolving power corresponding to the size of character to be recognized at the image input, extracting a character from the entered image information with said resolving power, and recognizing thus extracted character.

Also the above-mentioned object can be attained, according to the present invention, by an image processing apparatus provided with image input means capable of entering image information with an arbitrary resolving power, and recognition means for recognizing the character information in the image information entered by said image input means, said apparatus comprising derivation means for deriving the resolving power at the image input by said image input means, character extraction means for extracting character information from the input image information with the resolving power derived by said derivation means, and character recognition means for recognizing the character information extracted by said character extraction means.

The present invention can provide a character recognition apparatus capable of preventing deterioration in the feature vectors resulting from normalization or smoothing, thereby providing a high rate of recognition.

The recognition rate can be improved since there can be obtained feature vectors close to those of the original character image, regardless of the size of the character image. Though a similar effect can be obtained by counting the direction indexes in the original character image size and then varying the image size, but the selection of the normalization size as a multiple of block division facilitates the hardware construction and the high-speed processing as the normalization size can be substantially fixed.

As explained in the foregoing, there can be attained a reduced aberration between the normalized image formed in the feature extraction unit and the original character image, and an improved recognition rate in the character recognition apparatus, by the use of image input means capable of entering character information with an arbitrary resolving power, character feature extraction means for normalizing the character image and extracting the feature data, in the form of feature vectors, from thus normalized character image. means for calculating an optimum enlargement/ reduction ratio from the normalization size of said character feature extraction means and the resolving power of the image input means and designating the resolving power at the image input by said image input means.

DETAILED DESCRIPTION OF THE PREFERRED EMBODIMENTS

[Embodiment 1]

Figure 1:
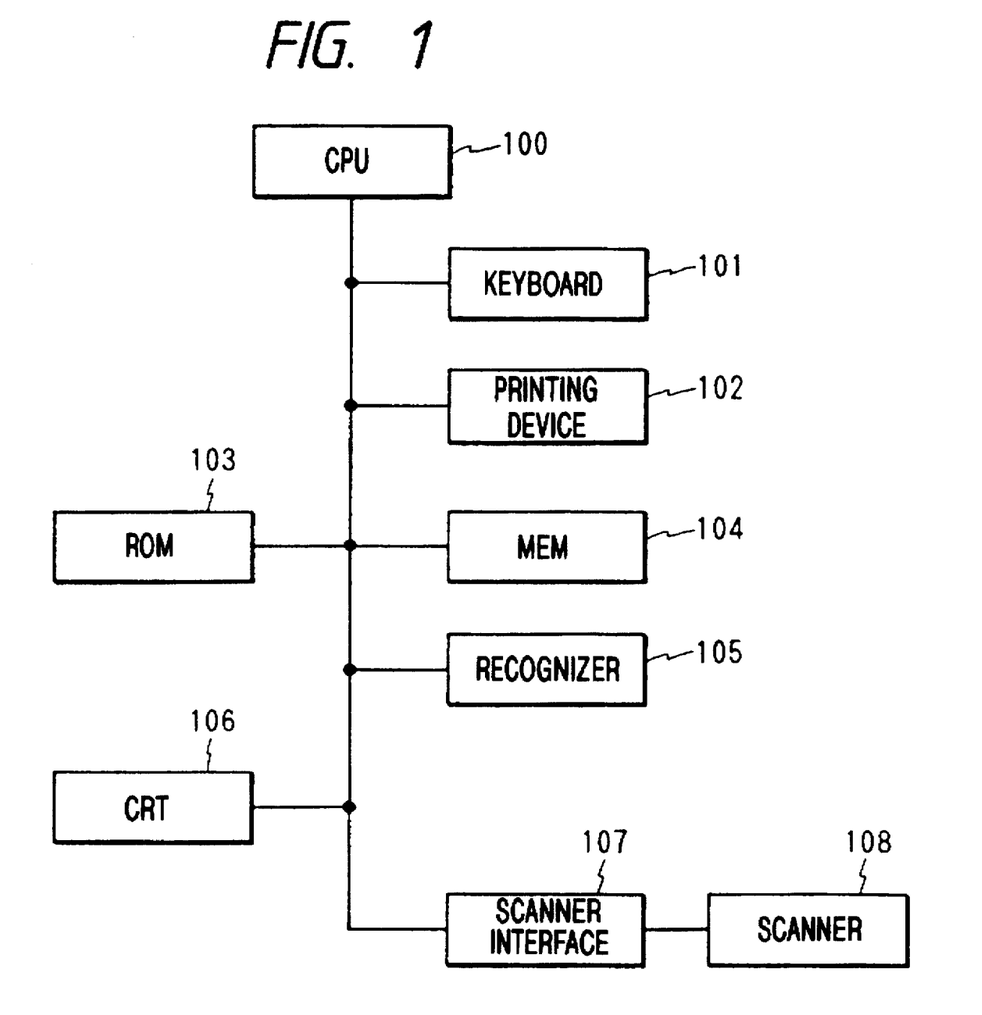
FIG. 1 is a block diagram of an image processing apparatus embodying the present invention.
Figure 8:
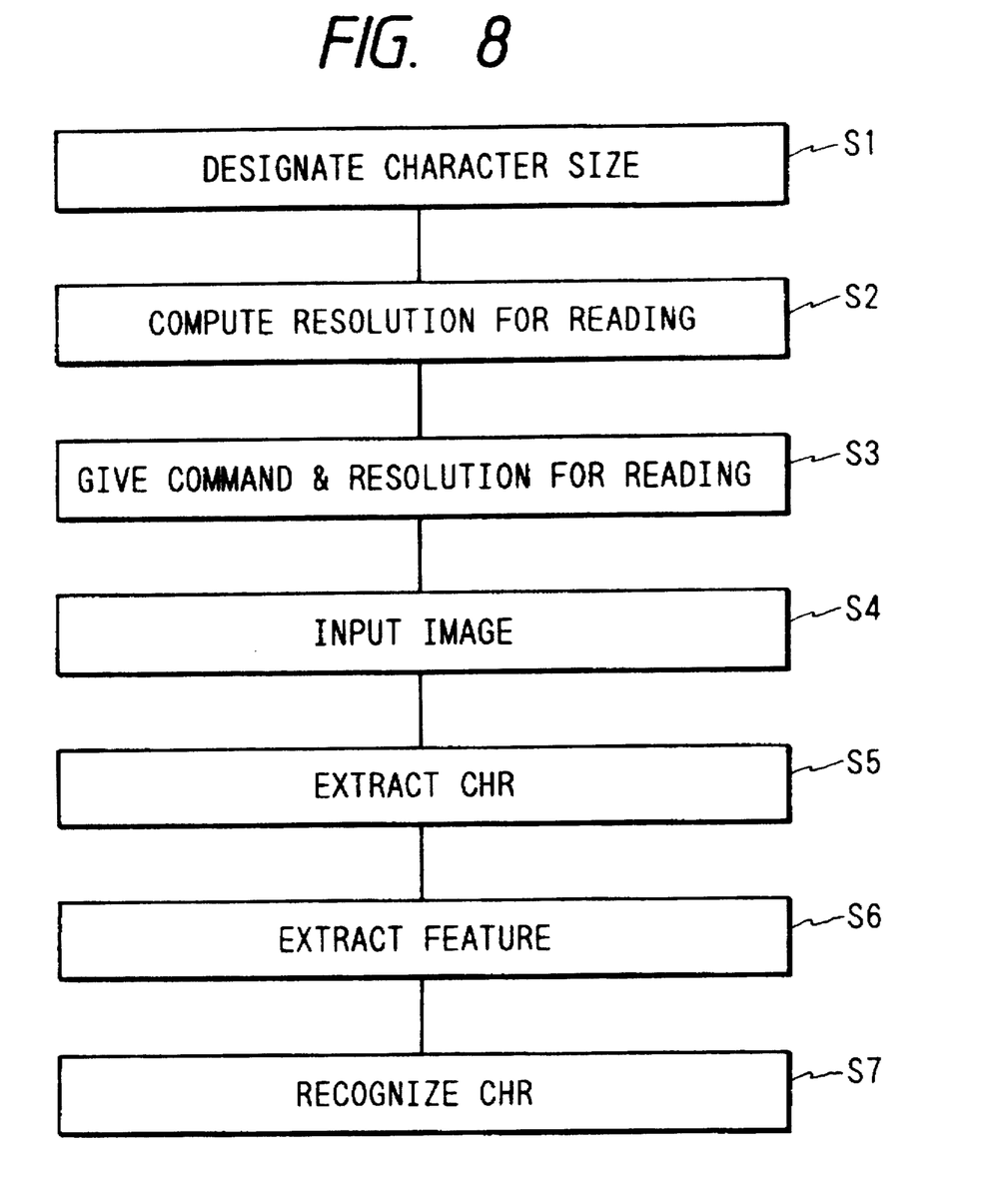
FIG. 8 is a flow chart of a first control sequence of said embodiment.
Figure 9:
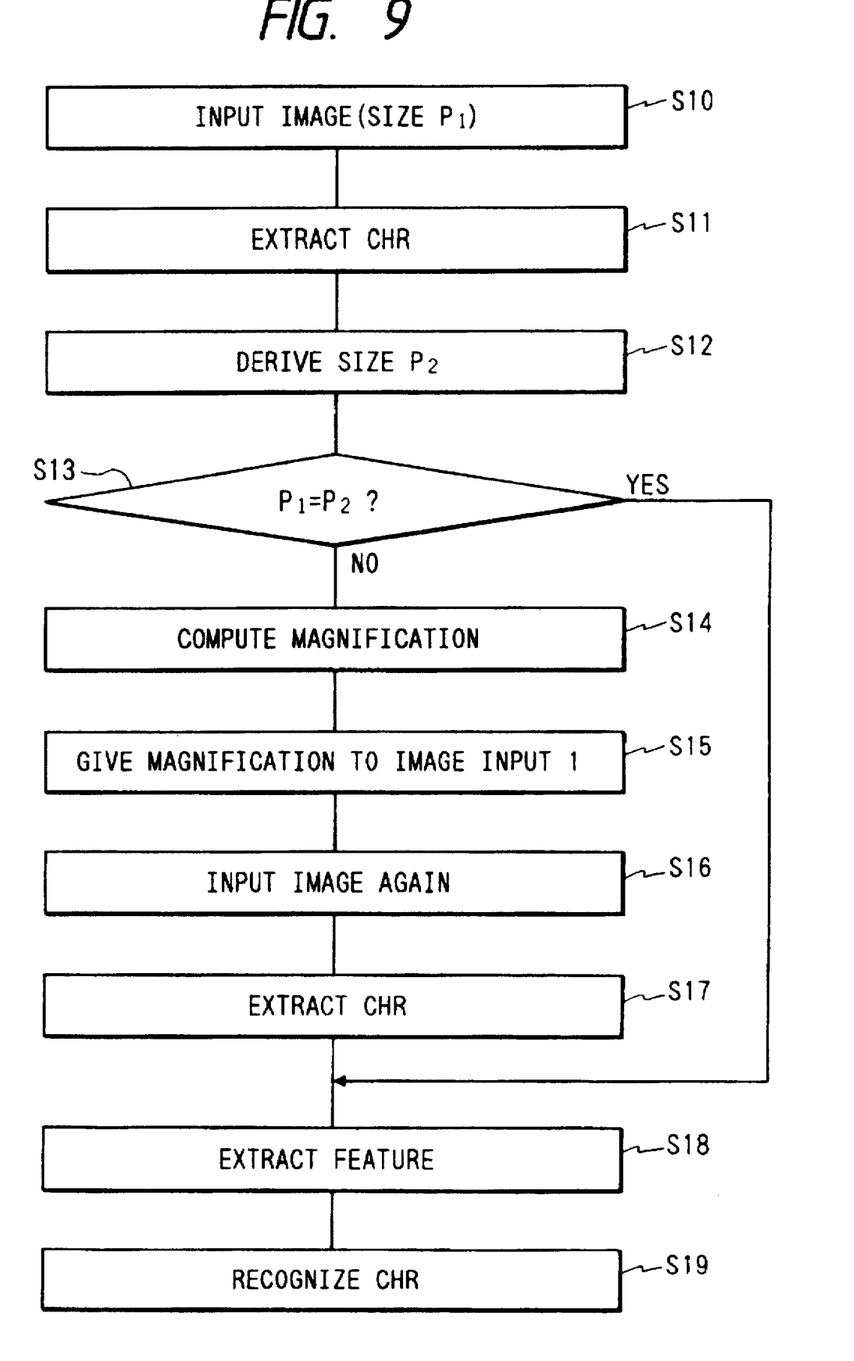
FIG. 9 is a flow chart of a second control sequence of said embodiment.

FIG. 1 is a block diagram showing basic structure of an embodiment of the present invention, wherein provided are a central processing unit (CPU) 100 for effecting processes and controls according to a flow chart as shown in FIG. 8 or 9; a keyboard 101 for entering characters and symbols, moving a cursor for indicating the position, and instructing a correction in case of a misrecognition; a pointing device 102; a read-only memory (ROM) 103 storing a dictionary to be employed in the 10 character recognition and control programs corresponding to the flow chart to be shown later; a memory 104 for storing the data read by a scanner 108; a recognizer unit 105 for finding candidate words from the data read by the scanner 108 and calculating the differences of said candidate words; a display unit 106 such as a cathode ray tube (CRT) for displaying the interim and final result of processing; an interface 107 for the scanner 108; and a scanner 108 for reading image information.

Figure 2:
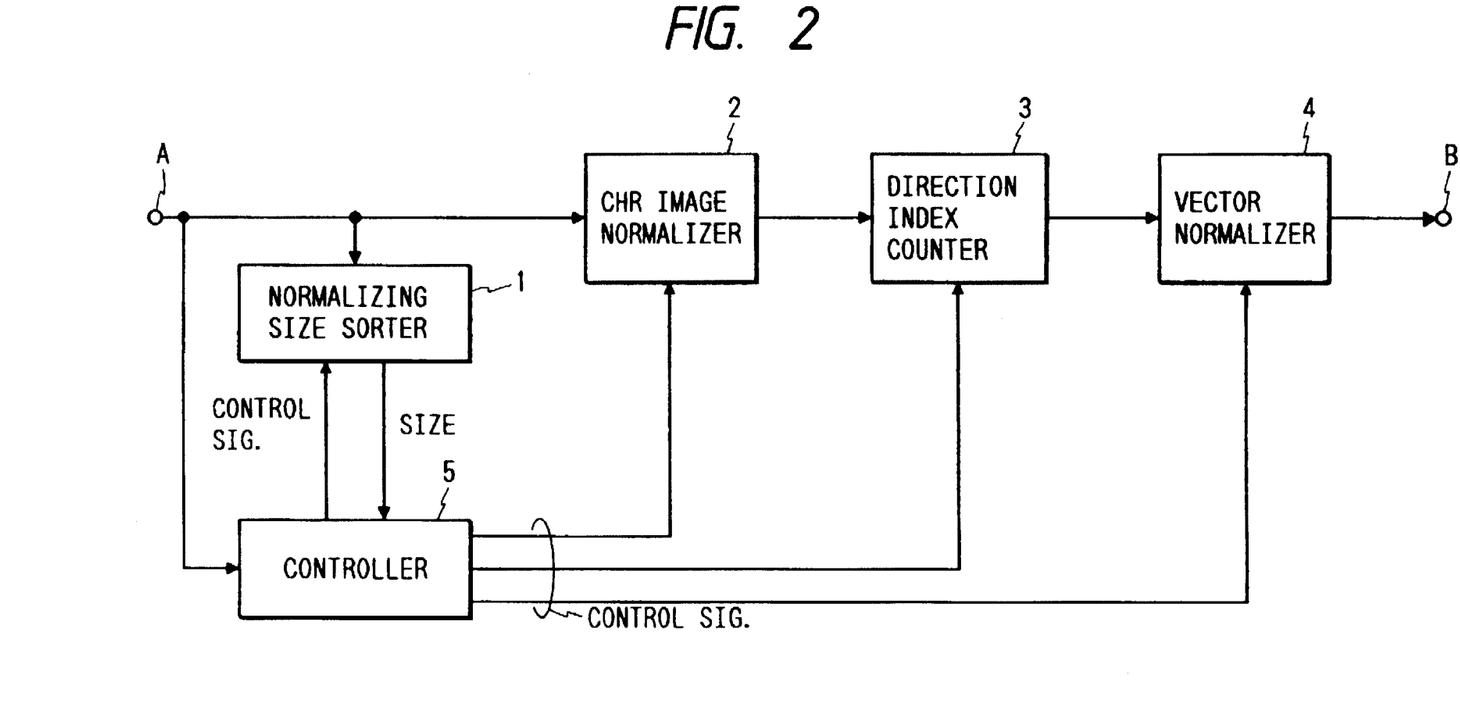
FIG. 2 is a block diagram showing structure of said embodiment.

FIG. 2 is a block diagram of the feature extraction unit of the present embodiment; wherein provided are an input terminal A for receiving, as in the conventional apparatus, a character image and character section information; a normalization size sorting unit 1 for sorting the character section information from the input terminal A thereby generating size information; a character image normalization unit 2 for normalizing the character image from input terminal A with a normalization size varied according to a control signal from a control unit 5; a direction index counter unit 3 for dividing the normalized image, obtained in the normalization unit 2, into blocks and counting the direction indexes in each block; a vector normalization unit 4 for varying the direction indexes obtained in the direction index counter unit 3 according to the image normalization size, thereby obtaining feature vectors; a feature vector output terminal B for sending the obtained vectors to a next matching unit; and a control unit 5 composed of unrepresented CPU, ROM, RAM etc. and serving to control the entire apparatus.

Figure 3A:
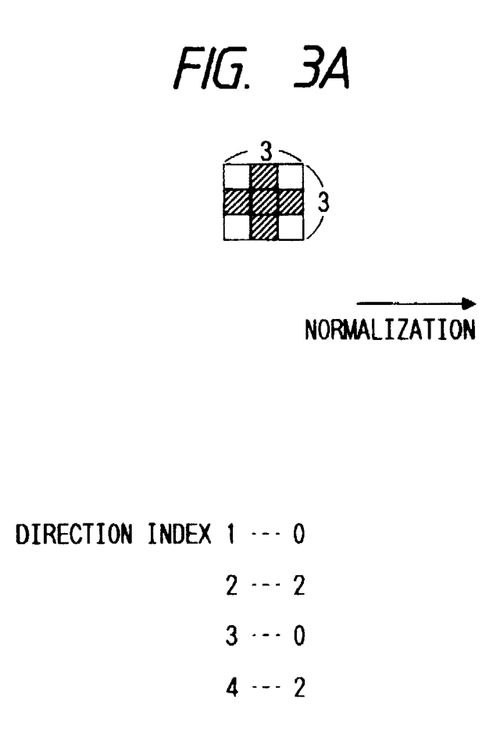
FIGS. 3A, 3B and 3C are views showing drawbacks in the conventional processing based normalization and processing.
Figure 3B:
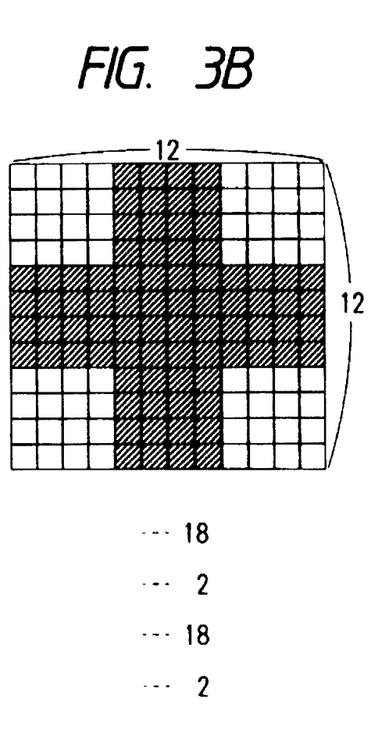
Figure 3C:
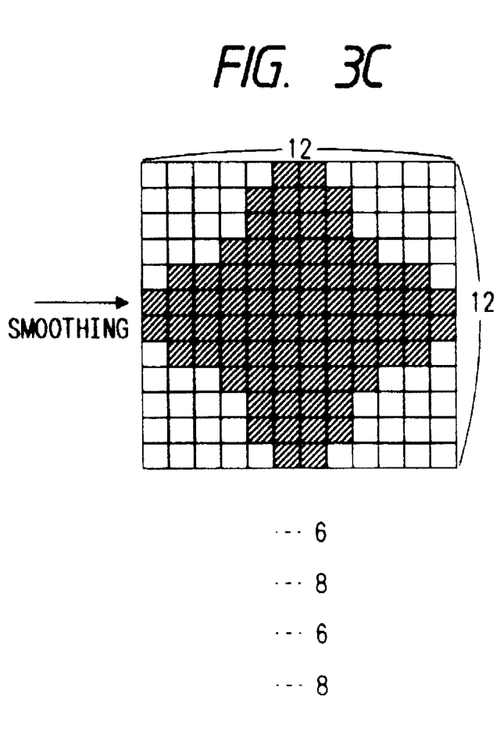

Let us assume that images shown in FIGS. 3A and 3B are entered from the input terminal A. If a normalization size I of "3" and a size II of "12" are available, the images of FIGS. 3A and 3B are respectively classified as the size I and II, and the corresponding size information are sent to the control unit 5. The character image normalization unit 2 receives the control signal from the control unit 5, and the character image and the character section information from the input terminal, effects normalization of the character image with a varied size, and the sends the normalized character pattern to the direction index counter unit 3. In the above-mentioned example, since the normalization sizes equal to the input image sizes are available, the images shown in FIGS. 3A and 3B are released without change.

The direction index counter unit 3 counts the direction indexes of the received normalized character pattern. If the block division is omitted for the purpose of simplicity, the image shown in FIG. 3A has the direction indexes "1", "2", "3" and "4" respectively of 0, 2, 0 and 2, while the image in FIG. 3B has those of 18, 2, 18 and 2. Then the vector normalization unit 4 normalizes the direction indexes, obtained in the counter unit 3, with ratios to reference values. The number of direction indexes (2×2 masks) for a normalization size is represented by $(size+1)^2$, or, if block division is employed, by:

$$\{(size+1)/\text{number of block division}\}^2,$$

wherein the number of block division is for example "4" in case of a block division of 4×4. In general, the block division is facilitated by selecting (normalization size+1) as n times of the block division number, wherein n is a natural number. This is represented by:

$$\text{normalization size} = n \times (\text{block division number}) - 1$$

$$(n=1, 2, 3, \ldots).$$

Selection of plural normalization sizes based on this relationship facilitates block division, thereby rendering the hardware construction easier.

If the block division number is selected as 1×1 for the purpose of simplification, the number of direction indexes is 16 for the size I, or 169 for the size II. If the reference value is selected as 169 (size II), the coefficient for the size I is 169/16, while that for the size II is 169/169.

By multiplying the direction indexes with said coefficient, there are obtained a feature vector 0, 10.6, 0, 10.6 for the image shown in FIG. 3A, and that 18, 2, 18, 2 for the image shown in FIG. 3B. In this manner the present embodiment can provide a feature vector close to that of the original image. The obtained feature vector is supplied from the output terminal B to the matching unit 16. The control unit 5 effects the size control and the control of various units.

In the following there will be explained the control sequence of the present embodiment, with reference to a block diagram shown in FIG. 7 and a flow chart shown in FIG. 8. The sequence shown in said flow chart is executed by the CPU 100, according to a program stored in the ROM 103.

Figure 7:
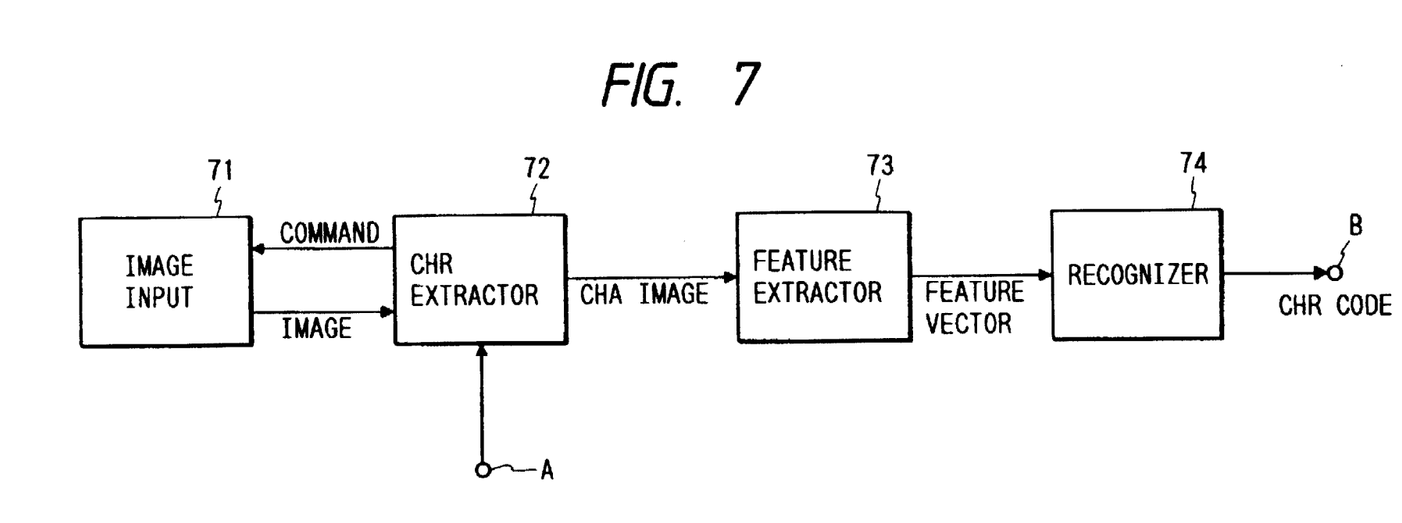
FIG. 7 is a block diagram of another embodiment.

Referring to FIG. 7, there are provided an interface unit A for entering instructions from the user; a scanner 71 for entering a character image to be processed, with variable resolving power at image reading; a character extraction unit 72 for giving commands for image input and resolving power for image reading to the scanner 71 in response to the instruction from the interface A, and effecting character extraction on the image received from the scanner 71; a feature extraction unit 73 for normalizing the character image extracted by the character extraction unit 72 and extracting the feature data as a feature vector; a recognition unit 74 for comparing the feature vector, obtained in the extraction unit 73 with the already stored feature data of characters and converting a candidate character of shortest distance to the corresponding character code; and an output unit B for releasing thus obtained character code.

Now referring to FIG. 8, at first a process start instruction from the user and the character size in the text to be processed are transmitted from the interface A to the character extraction unit 72 (S1). Said unit calculates an optimum resolving power for image reading, based on said character size and the normalization size of the feature extraction unit 73 (S2), and sends said resolving power and an image reading command to the reader 71 (S3). The reader 71 effects text reading with the designated resolving power and sends the read image to the character extraction unit 72 (S4). In response said unit 72 effects character extraction (S5) and sends the extracted character image to the feature extraction unit 73. Subsequently the feature extraction unit 73 executes feature extraction (S6), and the recognition unit 74 executes character recognition (S7), and the obtained result is released as a character code from the output unit B.

In the following there will be explained, with reference to a flow chart shown in FIG. 9, a variation in which the character recognition can be conducted without instruction of character size by the operator. At first a character size P1 is assumed, and the image is entered with a resolving power matching said assumed character size P1. Then the actual character size P2 is derived from thus entered image information, and the subsequent processing is conducted according to said actual character size.

Referring to the flow chart shown in FIG. 9, at first a process start command is transmitted from the interface A to the character extraction unit 72, which in response transmits, to the image input unit 71, an image reading command with a resolving power matching a most frequently used character size P1 (for example 12 points). The image input unit 71 sends the image with thus designated resolving power (S10) to the character extraction unit 72, which executes the character extraction (S11). Then the size P2 of the extracted character is derived (S12), and there is discriminated whether P1=P2 (S13). If P1=P2, the entered image information is directly subjected to feature extraction (S18) and character recognition (S19). On the other hand, if the step S13 identifies P1≠P2, there is calculated an image size varying ratio for obtaining an optimum resolving power, based on P1 and P2 (S14), and the image is entered again by the image input unit 71 based on said ratio (S16). Then a character is extracted from the reentered image with the optimum resolving power (S17), then is subjected to feature extraction (S18) and character recognition (S19), and the obtained result is released from the output unit B.

[Embodiment 2]

Figure 10:
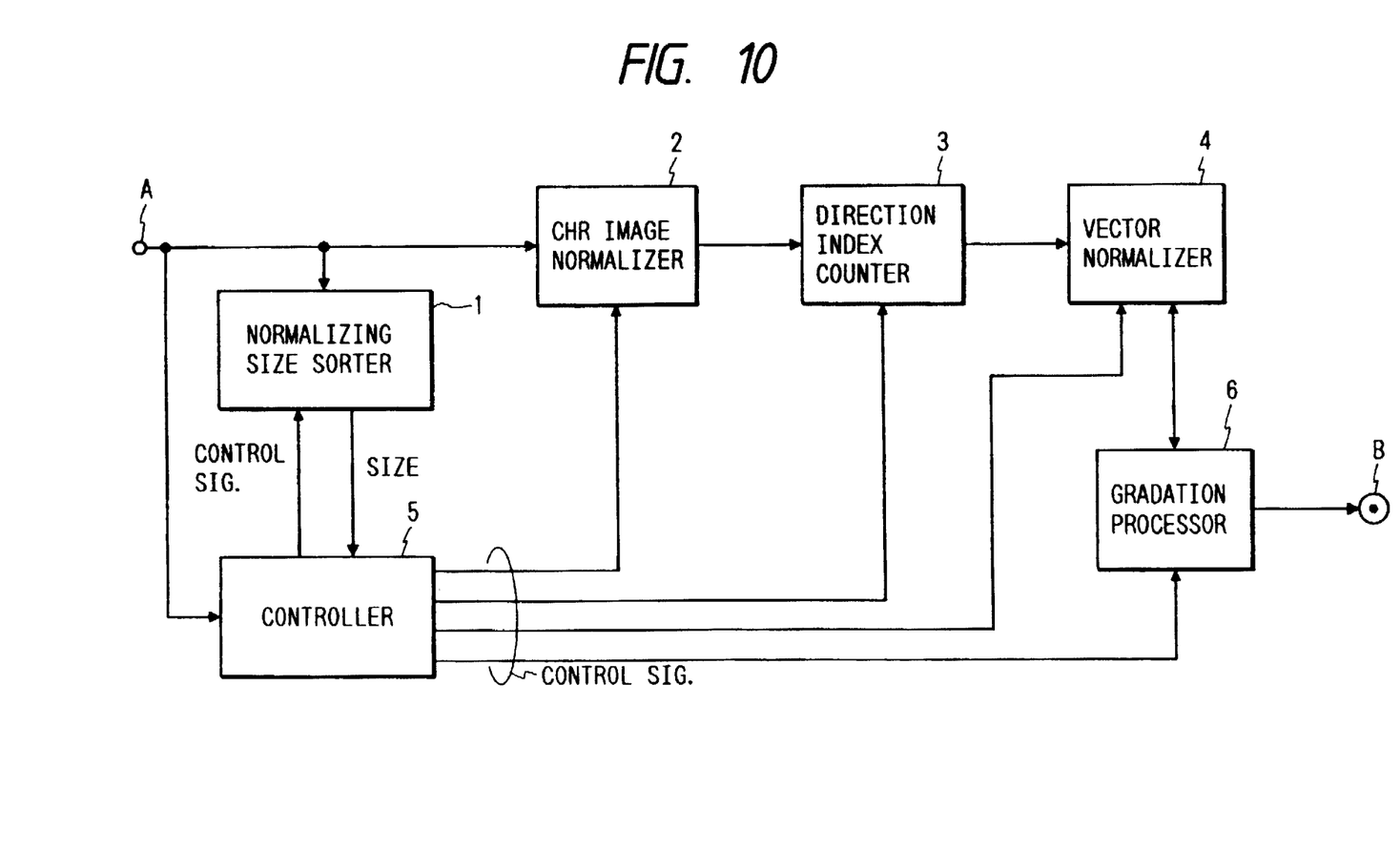
FIG. 10 is a block diagram of a second embodiment.
Figure 11:
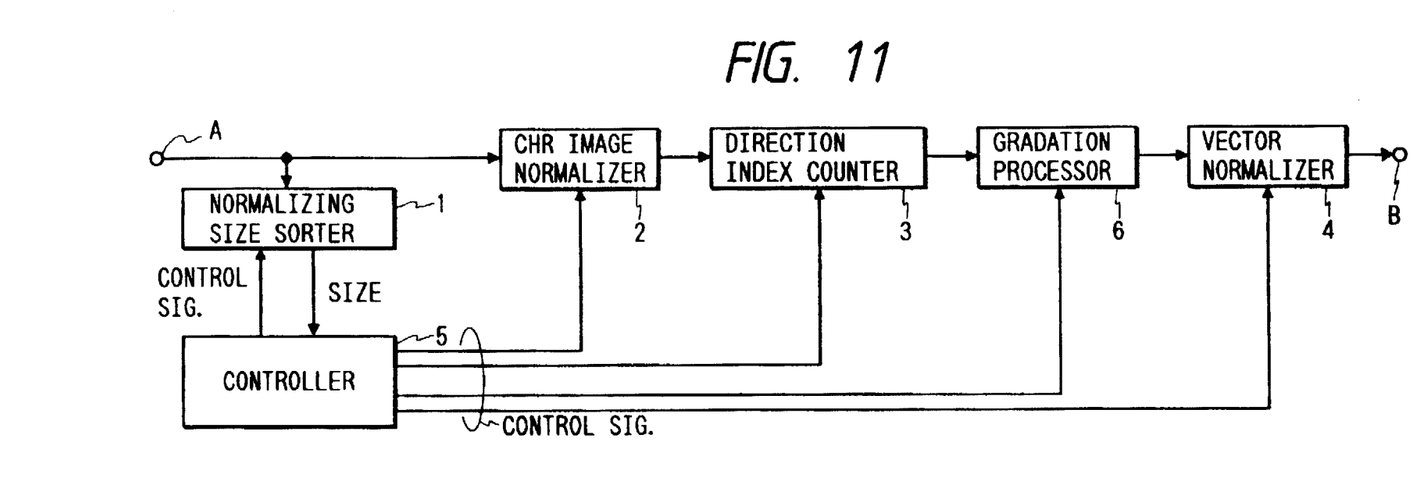
FIG. 11 is a block diagram of a variation thereof.

FIGS. 10 and 11 show an embodiment including a gradation processor unit 6 to the foregoing embodiment.

Figure 13A:
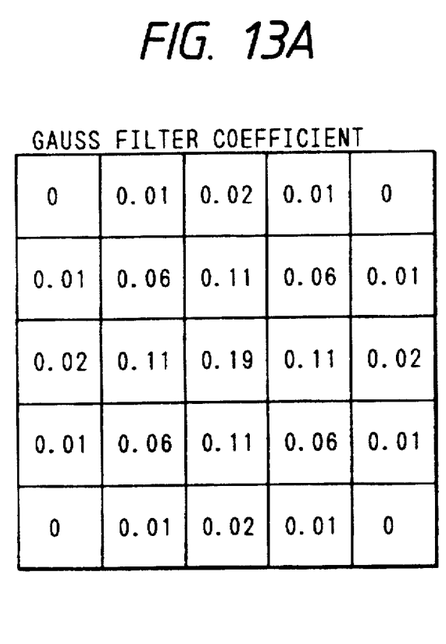
FIGS. 13A to 13D are views showing filtering coefficients.

The gradation process is to determine the feature vector for example of 4×4 blocks, by counting the direction indexes on 7×7 blocks in the direction index counter unit 3, and then applying a Gaussian filter, of which example is shown in FIG. 13A.

[Embodiment 3]

Figure 12:
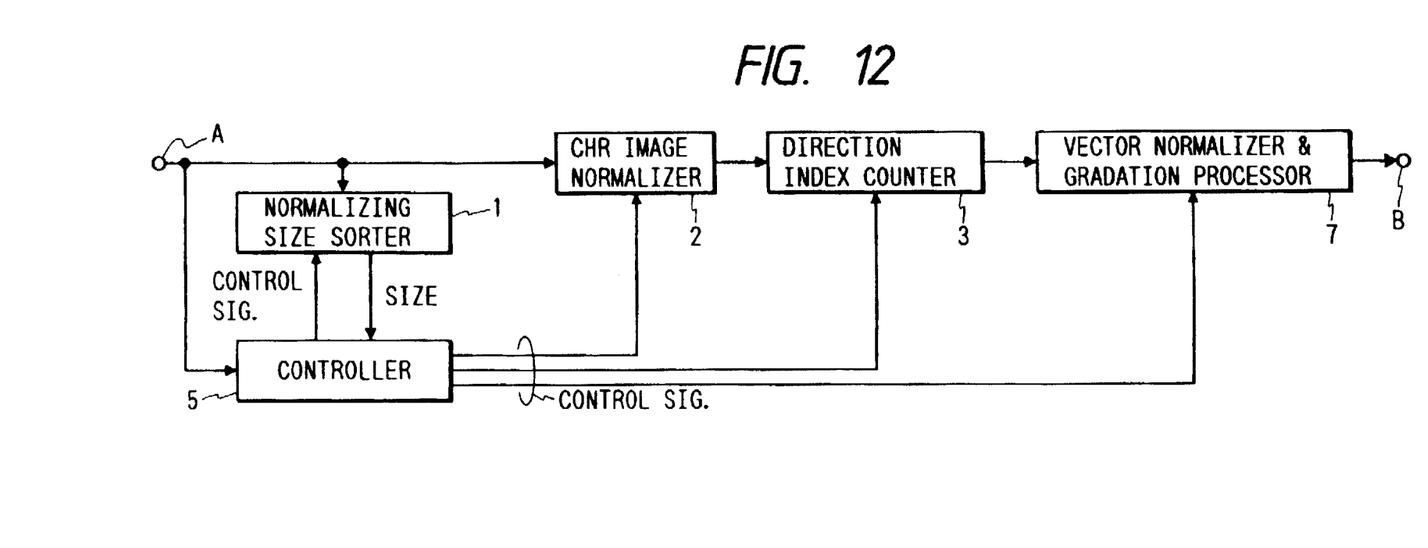
FIG. 12 is a block diagram of a third embodiment.

In this embodiment, the vector normalization unit 4 in the foregoing embodiments is replaced by a vector normalization and gradation processing unit 7 for simultaneously effecting the vector normalization and gradation process, as shown in FIG. 12.

Figure 13B:
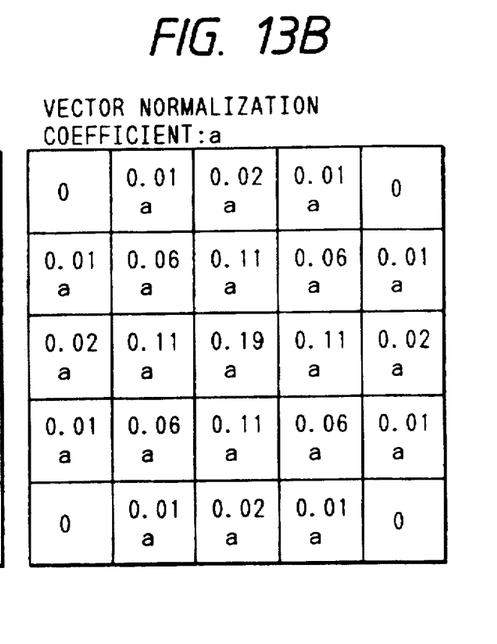
Figure 13C:
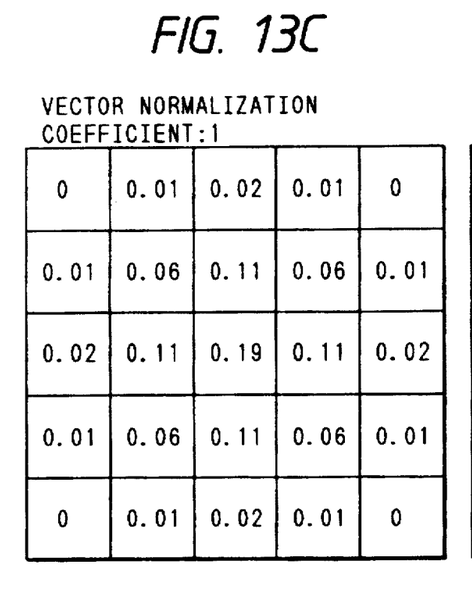
Figure 13D:
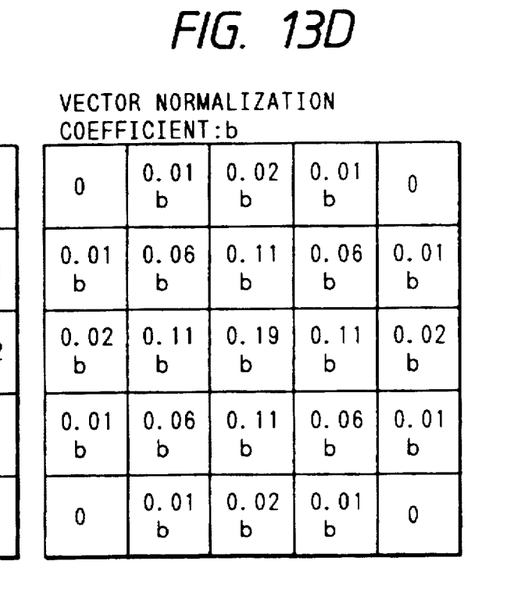

The gradation process is a filtering process with coefficients as shown in FIG. 13A. In the present embodiment, the vector normalization and the gradation process as in the 2nd embodiment can be achieved in one process by preparing tables, representing the products of said filtering coefficients and vector normalizing coefficients respective for different normalization sizes, as shown in FIGS. 13B–13D.

Figure 16A:
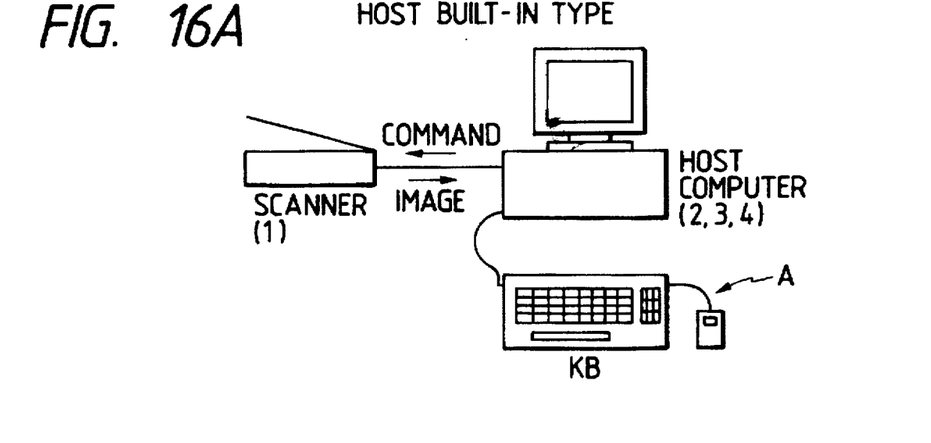
FIGS. 16A to 16C are views showing examples of system structure of the present invention.
Figure 16B:
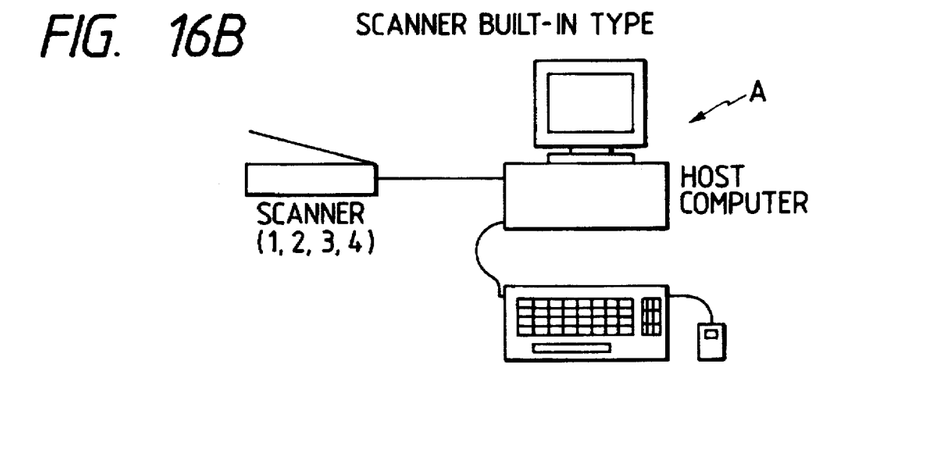
Figure 16C:
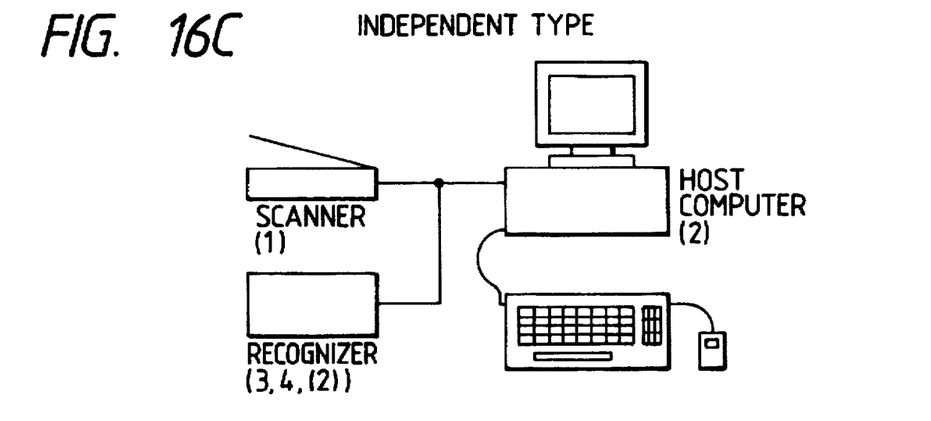

In the foregoing embodiments, the host computer, scanner and keyboard may be constructed independently or integrally combined as shown in FIGS. 16A to 16C.

The present invention is applicable to a system consisting of plural devices, an apparatus consisting of a single device, or a program that is supplied to a system or an apparatus.

What is claimed is:

1. An image processing apparatus comprising:

image input means for inputting a document image with an arbitrary resolving power;

determination means for determining a size of a character pattern in the document image input at the arbitrary resolving power by said image input means;

selection means for selecting one of a plurality of predetermined normalization sizes in response to the size of the character pattern determined by said determination means;

derivation means for deriving a second resolving power for re-inputting the document image, said second resolving power being different from the arbitrary resolving power and corresponding both to the size of the character pattern determined by said determination means and to the one normalization size selected by said selection means;

control means for controlling said image input means to re-input the document image with the second resolving power derived by said derivation means;

character feature extraction means for extracting a character feature from a character pattern included in the document image re-input with the derived second resolving power by said image input means;

character feature correction means for correcting the character feature extracted by said character feature extraction means in accordance with the selected one normalization size; and character recognition means for recognizing the character pattern in accordance with the character feature corrected by said character feature correction means.

2. An image processing apparatus according to claim 1, wherein said derivation means inputs a character from input image information with a resolving power corresponding to an arbitrary character size, determines character size from the inputted character, compares the arbitrary character size with the determined character size, and derives a second resolving power in accordance with the comparison.

3. An apparatus according to claim 1, wherein said image input means comprises an image scanner.

4. An apparatus according to claim 1, further comprising means for displaying the character pattern recognized by said character recognizing means on a display device.

5. An image processing method for recognizing a character pattern in an image, comprising the steps of:

inputting an image at a first resolving power;

determining a size of a character pattern in the document image input at the first resolving power;

selecting one of a plurality of predetermined normalization sizes in response to the determined size of the character pattern;

deriving a second resolving power at which to re-input the image, said second resolving power being different from the first resolving power and corresponding both to the determined size of the character pattern and to the selected one normalization size;

re-inputting the image at the second resolving power;

extracting a character feature from a character pattern included in the image re-input at the derived second resolving power;

correcting the extracted character feature in accordance with the selected one normalization size; and recognizing the character pattern in accordance with the corrected character feature.

6. A method according to claim 5, wherein said deriving step comprises the steps of inputting a character from input image information with a first resolving power corresponding to an arbitrary character size, determining character size from the inputted character, comparing the arbitrary character size with the determined character size, and deriving a second resolving power in accordance with the comparison.

7. A method according to claim 5, wherein the image is input by an image scanner.

8. A method according to claim 5, including the step of:

displaying the recognized character on a display device.

9. A computer-readable memory medium storing computer-executable process steps, the steps comprising:

a inputting step to input an image at a first resolving power;

a determination step to determine a size of a character pattern in the document image input at the first resolving power;

a selection step to select one of a plurality of predetermined normalization sizes in response to the determined size of the character pattern;

a derivation step to derive a second resolving power at which to re-input the image, said second resolving power being different from the first resolving power and corresponding both to the determined size of the character pattern and to the selected one normalization size;

a re-input step to re-input the image at the second resolving power;

an extraction step to extract a character feature from a character pattern included in the image re-input at the derived second resolving power;

a correction step to correct the extracted character feature in accordance with the selected one normalization size; and a recognition step to recognize the character pattern in accordance with the corrected character feature.

10. A computer-readable memory medium storing computer-executable process steps according to claim 9, wherein the image is input by an image scanner.

11. A computer-readable memory medium storing computer-executable process steps according to claim 9, the steps further comprising:

a display step to display the recognized character on a display device.

12. A computer-readable memory medium storing computer-executable process steps according to claim 9, wherein said deriving step comprises an input step to input a character from input image information with a first resolving power corresponding to an arbitrary character size, a determination step to determine a character size from the inputted character, a comparison step to compare the arbitrary character size with the determined character size, and a derivation step to derive a second resolving power in accordance with the comparison.

* * * * *